United States Patent
Gorshe et al.

(10) Patent No.: US 7,124,182 B2
(45) Date of Patent: Oct. 17, 2006

(54) METHOD FOR REAL-TIME DETECTION OF WHICH UNITS ARE PRESENT ON AN ARCNET

(75) Inventors: Steven Scott Gorshe, Beaverton, OR (US); Aaron Jeffrey Parker, Portland, OR (US)

(73) Assignee: NEC Eluminant Technologies, Inc., Herndon, VA (US)

( * ) Notice: Subject to any disclaimer, the term of this patent is extended or adjusted under 35 U.S.C. 154(b) by 980 days.

(21) Appl. No.: 09/941,908

(22) Filed: Aug. 29, 2001

(65) Prior Publication Data

US 2003/0051028 A1    Mar. 13, 2003

(51) Int. Cl.
G06F 15/173    (2006.01)
(52) U.S. Cl. ....................... 709/224; 709/226
(58) Field of Classification Search ............... 709/223, 709/224, 227, 228, 251, 226; 370/221
See application file for complete search history.

(56) References Cited

U.S. PATENT DOCUMENTS 5,335,221 A * 8/1994 Snowbarger et al. ....... 370/221
5,862,338 A * 1/1999 Walker et al. ............... 709/224

* cited by examiner

Primary Examiner—Paul H. Kang
(74) Attorney, Agent, or Firm—Scully, Scott, Murphy & Presser, P.C.

(57) ABSTRACT

The present invention preferably places a hardware circuit between the SCU's ARCNET transceiver and the backplane bus rather than a parallel snooper circuit. This circuit builds the map based on the tokens it observes. When the circuit detects the token for the SCU, it blocks the token transmission to the SCU's ARCNET transceiver. It then sends a minimum length "ping" message to each unit that was present on the bus during the last token rotation, but is not present during the token rotation that just ended. Since units that have lost their token can still respond to a Free Buffer Enquiry message, the circuit can use it as a ping to verify whether the missing unit(s) are actually missing or have just lost their token due to noise. After verification, the token is forwarded to the SCU's ARCNET transceiver.

29 Claims, 15 Drawing Sheets

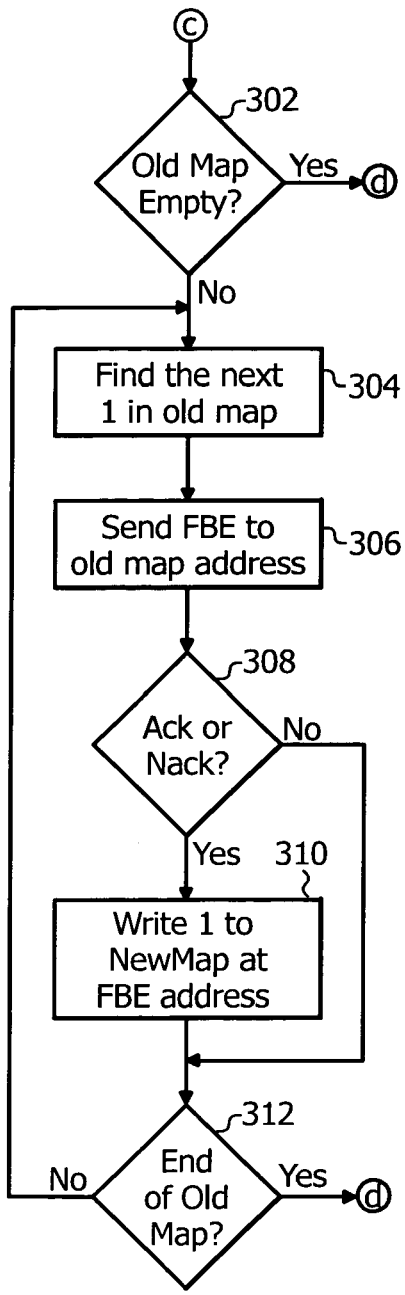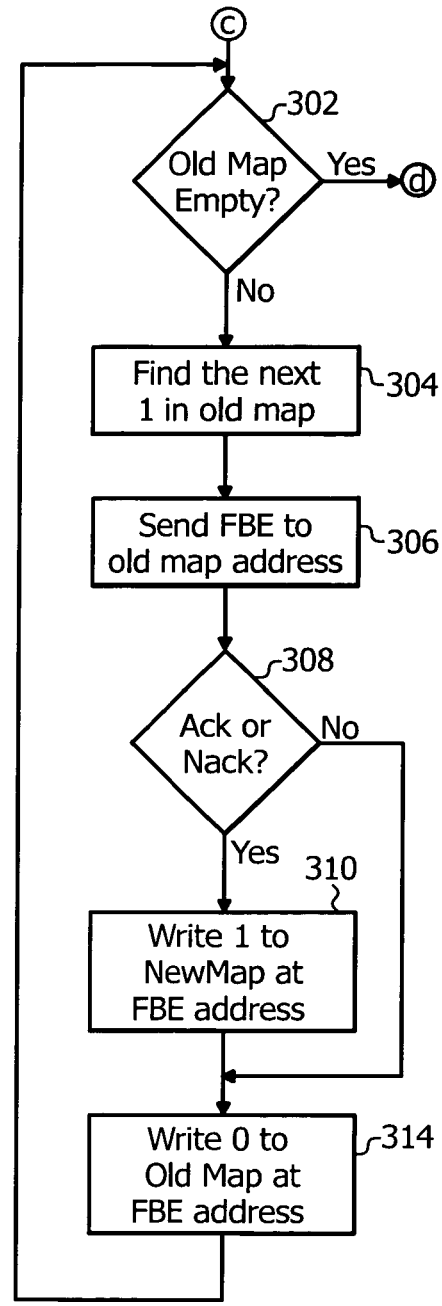
Figure 3a  Figure 3b

METHOD FOR REAL-TIME DETECTION OF WHICH UNITS ARE PRESENT ON AN ARCNET

BACKGROUND OF THE INVENTION

1. Field of the Invention

The present invention relates generally to sending data on a token bus and, more particularly, to a method for reliable real-time detection of which units are present on an ARCNET.

2. Prior Art

A token bus operates as a shared medium. Only the unit which has the "token" (alternatively referred to as an "invitation to transmit" (ITT)) is allowed to send data on the bus. When a unit (node) has transmitted any data it has to send, it sends the token to the next unit in the token rotation (i.e., transmits a token with the destination address of the next unit). Inherent in a token bus system is the ability to know which units are present on the bus by monitoring the addresses of the tokens being sent during each token rotation with a bus "snooper" circuit. Here, the snooper circuit is assumed to reside in a system controller unit (SCU).

The ARCNET LAN protocol, as described in ANSI Standard 878.1, can be summarized as follows. To build the token rotation list, which must occur whenever a new unit is added to the bus, the new unit "jams" the bus by sending a long pattern guaranteed to create a lost token situation. Once this situation has occurred, the bus will be idle until the unit with the highest address times out. (The time-out value is a function of a unit's address value.) This unit then attempts to find the unit with the next higher address value (which, due to the modulo 255 arithmetic is actually the unit with the lowest address value). This unit will in turn try to find the unit with next higher address value, and so on until each unit has determined which unit has the next highest address to its own. The token rotation is now established and each unit retains only the address of the unit to which it sends tokens. The method by which a unit finds the unit with the next higher address value is discussed further below in the discussion of units being removed from the bus.

Under normal, steady-state operation, a unit receiving a token sends a token to the next unit in the list if it has no data to send. If the unit receiving a token has data to send, it first queries the destination with a Free Buffer Enquiry (FBE) message. If the destination unit has buffer space available to receive a packet, it responds with an ACK message, and if its receive buffers are currently full, it responds with a NACK message. If it receives an ACK to the FBE, the unit with the token sends its packet and then sends the token to the next unit. If it receives a NACK message, it sends the token to the next unit immediately. (The unit will attempt to send the message again the next time it has the token.) Each unit has a finite amount of time to respond to a token by either initiating a packet transmission or sending another token. The same response time is required to respond to a FBE. If a unit fails to respond to a FBE, the sending unit assumes that this unit is not in the system and quits attempting to send that packet.

If a unit fails to respond to the token, the sending unit assumes that this unit has been removed from the system. It then attempts to find the next unit in the rotation (i.e., the unit with the next higher address value). This search for the next unit is done by incrementing the token destination address by '1'. If the unit at that address responds to the token, the sending unit stores that address as its token destination. If the unit at that address fails to respond, the unit again increments the address and sends another token and continues the process until the next unit is found.

Noise on the ARCNET bus can cause the following problems with token passing:

1) If noise corrupts a token, the destination will not recognize it and hence will not respond. The sending unit will treat this situation the same as if the unit was removed and the original destination unit will be deleted from the map. Eventually, the original destination unit will experience a time-out due to not receiving a token and will force a new-unit bus reconfiguration.

2) Noise after a token is interpreted as a response to the token. This case creates a lost token situation that is covered under normal bus reconfiguration.

The first case is the one that causes the difficulties for a token map snooper circuit since it is impossible to distinguish this event from an actual unit removal/failure. If fast real-time response is not required, the snooper can simply wait until the deleted unit causes a reconfiguration and rejoins the bus. In telecommunications systems that rely on the snooper bus map to trigger unit protection switching from a failed/removed working unit to a standby protection unit, waiting for reconfiguration is not an option. The deleted unit will wait 840 ms before triggering the reconfiguration and the protection switch must be completed within 60 ms (10 ms for detecting the removal plus 50 ms to complete the switch).

SUMMARY OF THE INVENTION

Therefore it is an object of the present invention to provide a method and apparatus for detection of which units are present on a network which overcome the problems associated with the methods of the prior art.

The present invention preferably places a hardware circuit between the SCU's ARCNET transceiver and the backplane bus rather than a parallel snooper circuit. This circuit builds the map based on the tokens it observes. When the circuit detects the token for the SCU, it blocks the token transmission to the SCU's ARCNET transceiver. It then sends a minimum length "ping" message to each unit that was present on the bus during the last token rotation, but is not present during the token rotation that just ended. Since units that have lost their token can still respond to a Free Buffer Enquiry message, the circuit can use it as a ping to verify whether the missing unit(s) are actually missing or have just lost their token due to noise. After verification, the token is forwarded to the SCU's ARCNET transceiver. Performing the verification in hardware insures that it can be done in a minimum time and can be done reliably at the end of the rotation rather than waiting multiple additional token rotations for a stable map.

Accordingly, a method for detecting units present on a network bus is provided. The method comprises: monitoring a token rotation to determine the units which are present on the network bus; building an initial map of the network bus according to the monitored token rotation; monitoring a subsequent token rotation to determine the units which are present on the network bus at the subsequent time; building a new map of the network bus according to the subsequent token rotation by storing the addresses which respond to the transmitted token rotation; comparing the initial and new maps of the network bus to determine any differences therebetween; sending a free buffer enquiry to each address which is determined to be missing from the initial map; and building a master map of the units present on the network bus based on the new map and the responses to the free buffer enquiries.

Also provided is an apparatus for detecting units present on a network bus. The apparatus comprises: means for monitoring a token rotation to determine the units which are present on the network bus; means for building an initial map of the network bus according to the monitored token rotation; means for monitoring a subsequent token rotation to determine the units which are present on the network bus at the subsequent time; means for building a new map of the network bus according to the subsequent token rotation by storing the addresses which respond to the transmitted token rotation; means for comparing the initial and new maps of the network bus to determine any differences therebetween; means for sending a free buffer enquiry to each address which is determined to be missing from the initial map; and means for building a master map of the units present on the network bus based on the new map and the responses to the free buffer enquiries.

Still yet provided are a computer program product for carrying out the methods of the present invention and a program storage device for the storage of the computer program product therein.

BRIEF DESCRIPTION OF THE DRAWINGS

These and other features, aspects, and advantages of the apparatus and methods of the present invention will become better understood with regard to the following description, appended claims, and accompanying drawings where:

FIGS. 3a and 3b illustrate flow diagrams for the Verify (Confirm) New Map block of FIG. 1.

DETAILED DESCRIPTION OF THE PREFERRED EMBODIMENT

Figure 1:
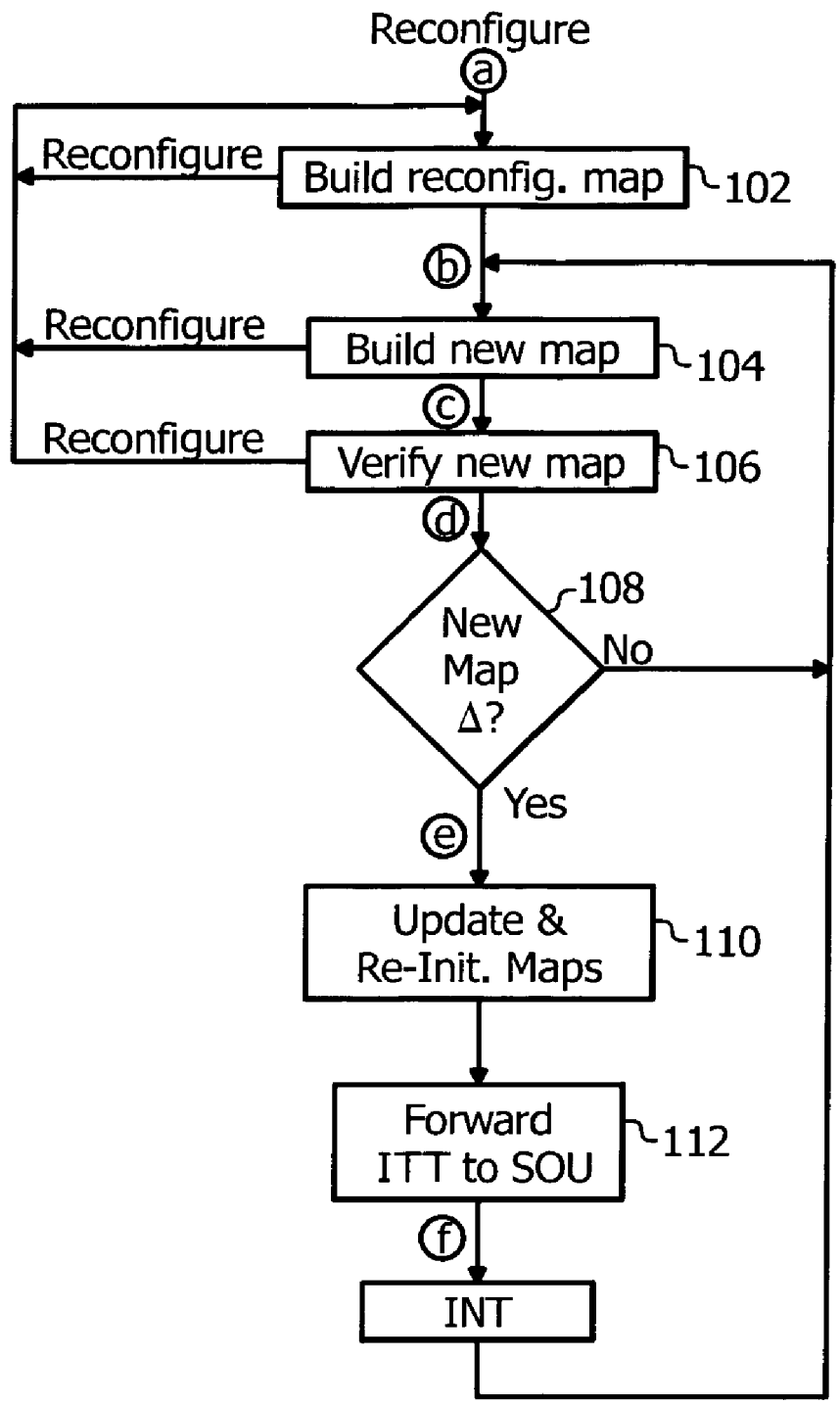
FIG. 1 illustrates a high-level flow diagram of a preferred implementation of the methods of the present invention.

The methods of the present invention use a hardware-based technique to confirm whether a unit that has been dropped from the token rotation is truly failed/removed or the victim of noise on the token destined to it. The basic preferred flow is shown in FIG. 1. The bus snooper circuit builds an initial map during a bus reconfiguration cycle. After an initial map has been built, the snooper builds a new map during each token rotation. A rotation here is defined as the period from when the SCU (on which the snooper resides) sends a token to when it again receives a token. When the SCU receives a token, it then verifies whether those units deleted from the map during that rotation are actually removed. After verification, the master map is updated and the SCU microprocessor is interrupted if there have been actual units removed.

FIG. 1 illustrates a flow diagram for the detection methods of the present invention. The first step 102 after a bus reconfiguration is to build the initial map of which units are present in the system (i.e., the reconfiguration map). During each token rotation, a new map is built at step 104 of which units were present on that rotation. The new map is then verified at step 106 according the methods of the present invention. At step 108, the new map is compared to the old map. If the verified new map is different than the old map, it is updated at step 110. The detector maps are then reinitialized and the ITT is then allowed to go on to the system controller (SCU) at step 112. If the new map was different, an interrupt is generated for the system microprocessor and the method loops back to step 104. In all steps 102, 104, and 106, the detection of a reconfiguration causes the circuit to suspend its activities and go back to waiting for the new reconfiguration map.

Figure 5:
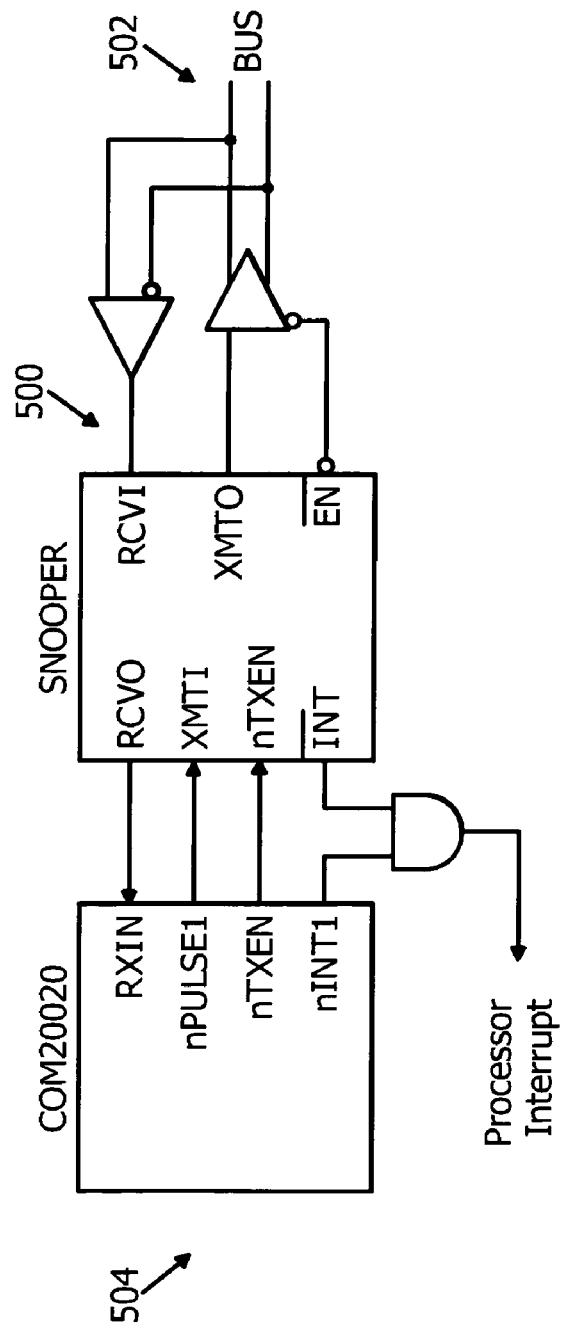
FIG. 5 illustrates a high-level circuit block diagram of the snooper circuit configuration of the present invention.

In contrast to previous snooper implementations in which the snooper had its own bus connection in parallel with the SCU's ARCNET transceiver (the SMSC COM20020 here), the methods of the present invention place the snooper circuit in series with the SCU ARCNET transceiver. This configuration is illustrated in FIG. 5. Normally, the new snooper circuit 500 forwards all of the information from the bus 502 directly to the SCU's ARCNET transceiver 504 with a few bits of delay for clock/data recovery (CDR) and re-encoding. When the SCU's token is detected by the snooper 500, it inhibits further data transmission to the SCU's ARCNET transceiver 504 so that the transceiver 504 does not see a valid token. The snooper 500, which then has control of the bus 502 by virtue of having the token, begins querying each unit that has been detected as disappearing from the map on that token rotation. The query is preferably done with a 'ping' message. The Free Buffer Enquiry (FBE) message is preferably used for the ping since it is a minimum length message and generally precedes a packet transmission. The snooper then waits to see if there is an ACK or NACK response to the FBE. This type of FBE ping works because the destination unit does not need the token to respond to it. Hence, a unit that has been accidentally dropped from the token rotation will still respond. If there is a response, the new map is updated to include that unit. If there is no response, the new map is left showing that units as deleted. Note that a unit dropped from the token rotation due to a corrupted token will remain out of the token rotation until it times out. At that time, it will force a bus reconfiguration.

The COM20020 is a commercial ARCNET transceiver IC 504. In normal operation the ARCNET transceiver 504 interfaces to the ARCNET bus 502 through the bus interface buffers at the right of FIG. 5. In the methods of the present invention, the snooper circuit 500 is placed between the ARCNET transceiver 504 and the bus interface logic 502 so that all the transmit and receive data between the ARCNET transceiver 504 and the ARCNET bus 502 pass through the snooper circuit 500. Locating the snooper 500 between ARCNET transceiver 504 and the ARCNET bus 502 allows the snooper 500 to intercept tokens destined for that ARCNET transceiver 504 so that the snooper 500 can take control of the bus for the purposes of verifying the map. The RCVI and RCVO signals are the receive data input and outputs to the snooper 500. Similarly, the XMTI and XMTO are the transmit data input and output. EN is the bus transmit enable.

Figures 2A, 2B:
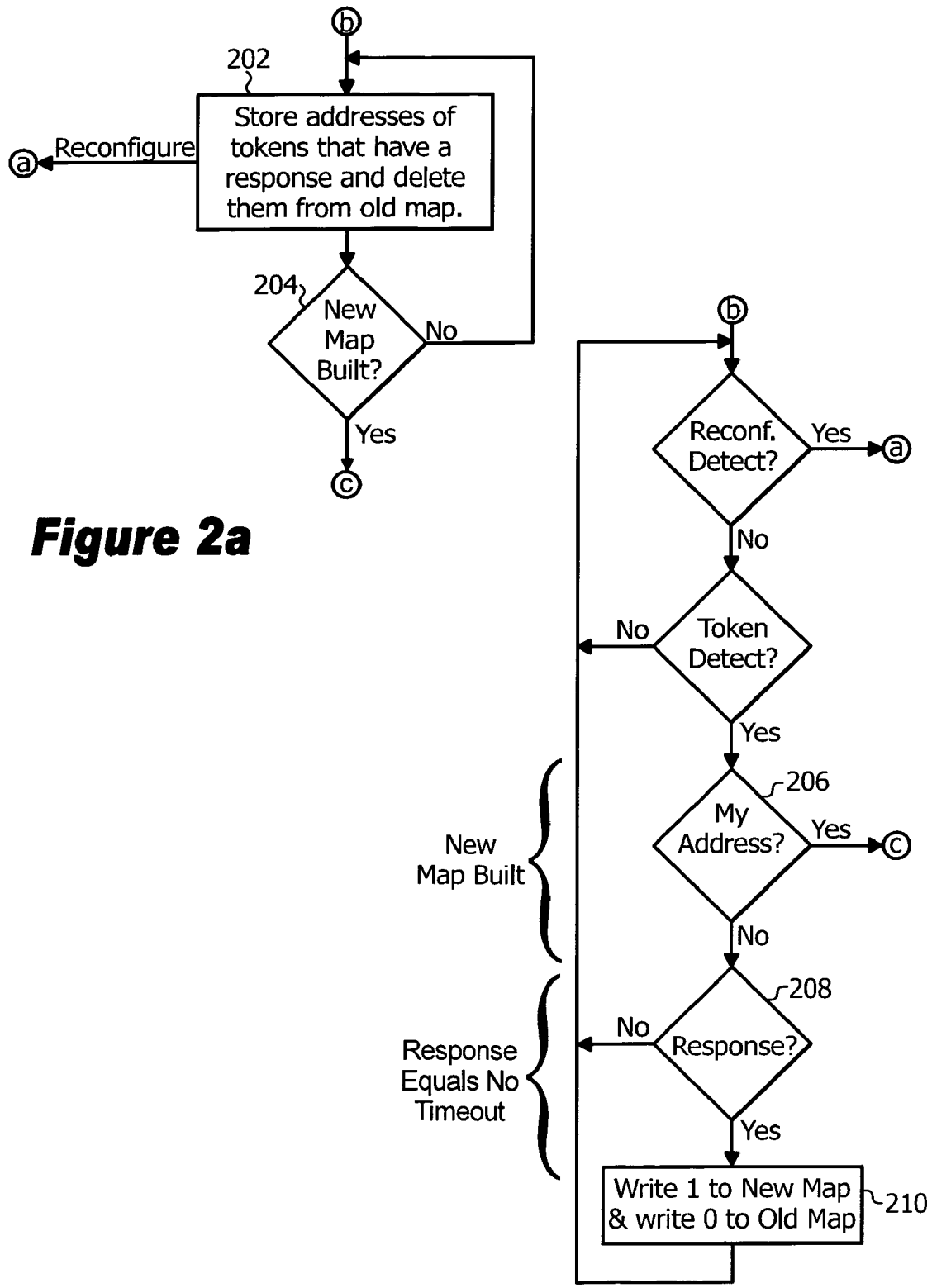
FIGS. 2a and 2b illustrate the new map building block of FIG. 1 with 2a showing the high-level flow and FIG. 2b illustrating the preferred implementation.
Figure 3C:
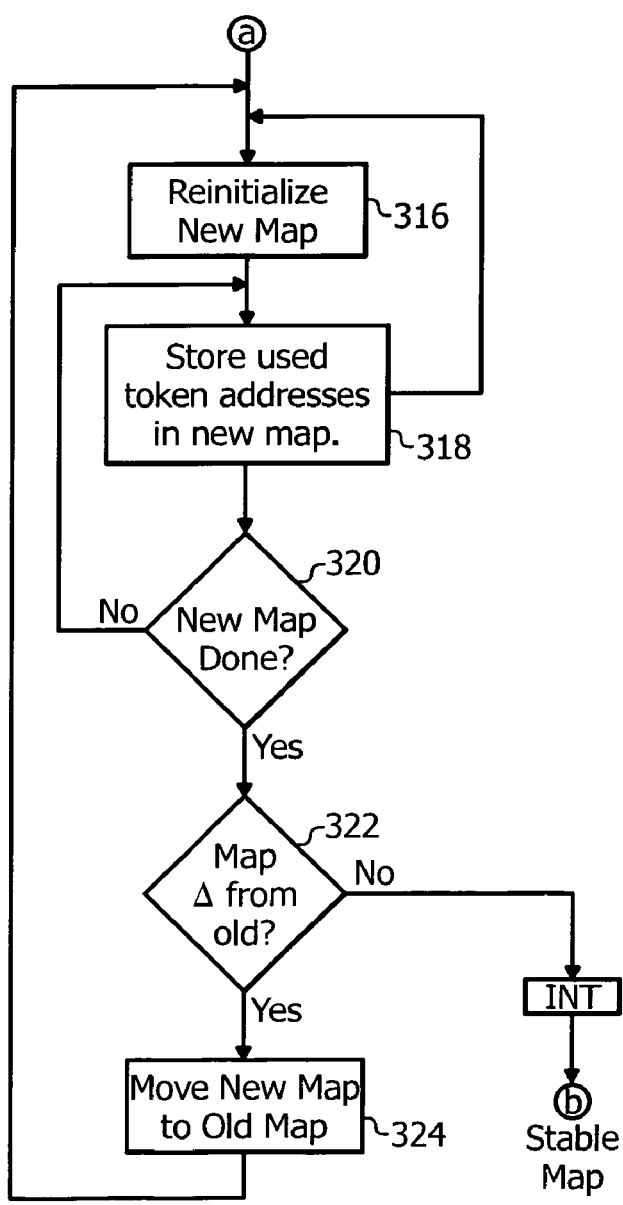
FIG. 3c illustrates a flow diagram for the Build Reconfiguration Map block of FIG. 1.
Figure 4:
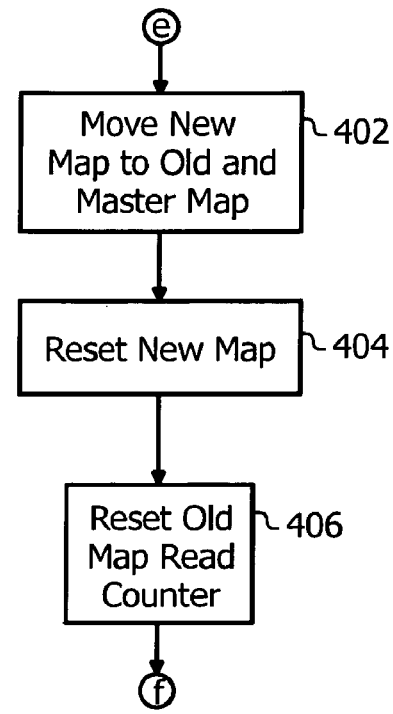
FIG. 4 illustrates a flow diagram for the "Update and Re-initialization" block of FIG. 1.

The new map building block diagram is shown in FIGS. 2a and 2b, with FIG. 2a showing the high-level flow and FIG. 2b illustrating the preferred implementation. FIGS. 3a and 3b show two potential implementations of the verification process with FIG. 3b illustrating the preferred implementation. FIG. 3c illustrates the preferred implementation for building the initial map after a bus reconfiguration. FIG. 4 illustrates the map storing and re-initialization preferred implementation performed after verification.

The preferred implementation of the methods of the present invention use three maps. The new map is the one under construction during the token rotation. The old map is the one from the previous token rotation. After the token rotation, the new map and the old map are compared to determined which units are missing and need to be pinged to verify their absence. After the verification, the updated new map is transferred to the old map and to the master map, which is the map ready by the SCU's microprocessor. The microprocessor is interrupted whenever a unit has been confirmed to be removed.

Referring now to FIGS. 2a and 2b there is shown the flow diagram for the "Build New Map" block 104 of FIG. 1. FIG. 2a illustrates that the functions of the Build New Map block are the storing of the addresses of tokens to which there is response. These addresses are stored in the new map and deleted from the old map at step 202 until it is determined that the new map is built at step 204. Referring now to FIG. 2b, in the preferred detailed implementation, when a token is detected on the bus, the first step 206 is to see if it is the unit's own token. If it is, then the process moves to the Verification block 106. Otherwise, the circuit waits to see if there is a response to the token at step 208. If there is no response, the circuit takes no action and goes back to waiting for the next token. If there is a response, a "1" is written to the new map and a "0" is written to the old map in the memory locations corresponding to that token address location at step 210. (The writing of a "0" to the old map resets that address location.)

Referring now to FIGS. 3a and 3b, the same illustrate flow diagrams for the Verify (Confirm) New Map block 106 of FIG. 1. In both of the implementations, the first step 302 is determining whether or not the old map is empty. Remember that the bits of the old map are reset whenever there is a response to that address. Thus, if the map is empty, there was response to every token and the new map will be the same as the old map. In that manner, this block combines both the verification function from FIG. 1 and the check to see whether the old and new maps are different. If the old map is not empty, the first address location containing a 1 is determined at step 304 followed by sending an FBE to the unit at that address location at step 306. If there is an acknowledgement (step 308-Y), then the unit is present and a 1 is written to the new map at that address location at step 310. In the implementation of FIG. 3a the old map is searched from the lowest to the highest address values for 1s. When the highest address location is reached, the search circuit resets to the lowest address value and the block is exited at step 312-Y. In the implementation illustrated in FIG. 3b, the old map is searched for the next address with a 1 as long as a 1 exists. Whenever an address location is verified, that location in the old map is reset at step 314. Here, the old map and new map are different if any of the tested locations does not respond with an acknowledgement.

Referring now to FIG. 3c, the same illustrates a flow diagram for the Build Reconfiguration Map block 102 of FIG. 1. A reconfiguration is caused by a new unit disrupting the bus in order to gain access to the token passing rotation. When a reconfiguration is detected, the new map is reset at step 316. Whenever a token is responded to (i.e., used) a 1 is stored in that new map location at step 318. When the reconfiguration is done (i.e., the new map build is done) (step 320-Y) then the new map can be checked against the old map at step 322 and the new map data is moved to the old map at step 324.

Referring now to FIG. 4, the same illustrates a flow diagram for the "Update and Re-initialization" block 110 of FIG. 1. The circuit is reinitialized for the next token rotation by moving the data from the new map to the old map and into the master map at step 402. The new map is then reset at step 404. If the implementation of FIG. 3 a is used, then the old map read counter is also reset to its lowest value at step 406.

Figure 6:
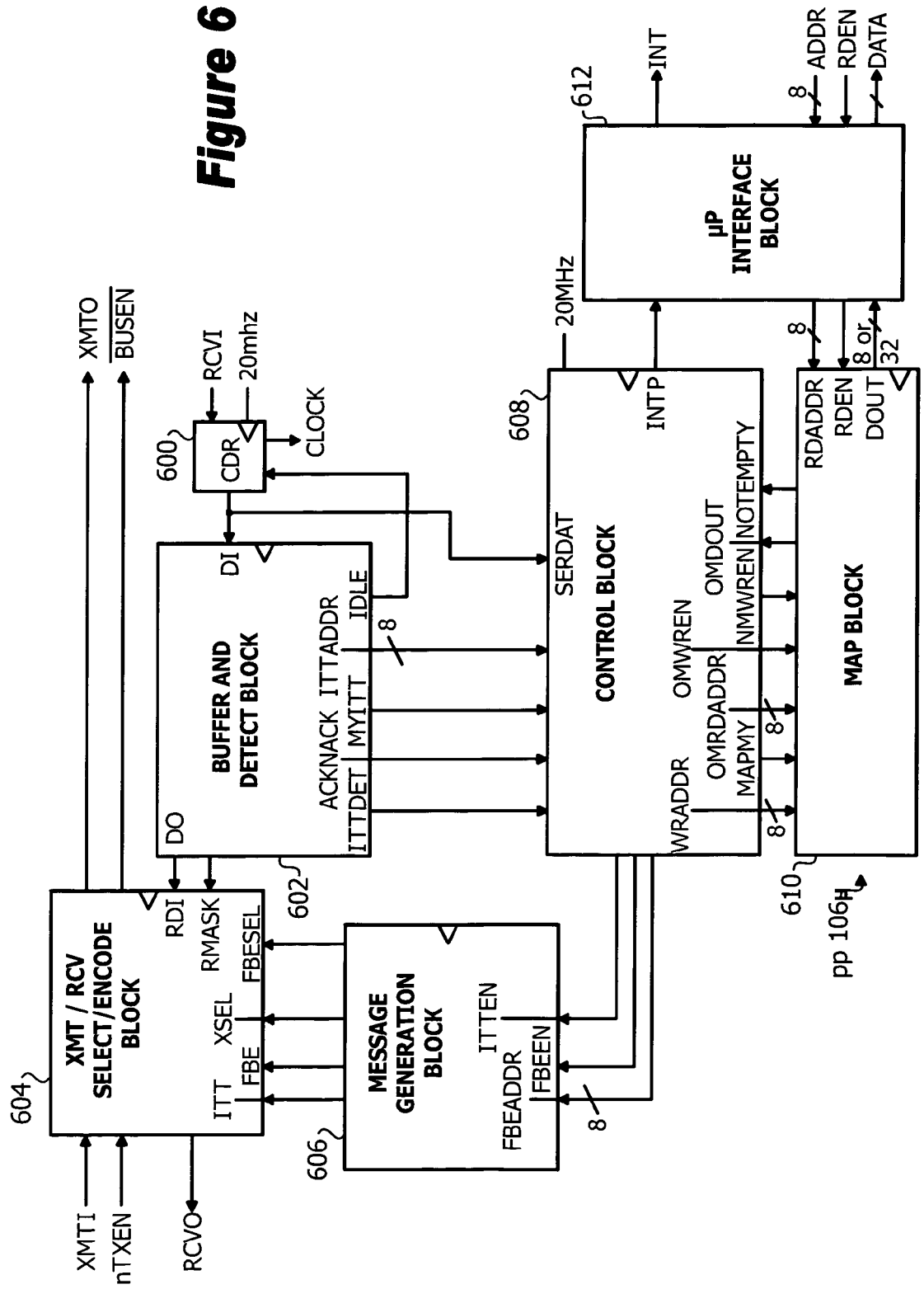
FIG. 6 illustrates a high level block diagram of the snooper circuit of FIG. 5.

Referring now to FIG. 6, the same illustrates a high level block diagram of the snooper circuit 500 of FIG. 5. The receive data flow is from left to right. The received data input goes to the clock and data recovery block (CDR) 600. The recovered data then goes to the Buffer and Detect Block 602 which buffers enough of the data to be able to detect tokens (ITTDET), acknowledgements (ACK) or negative acknowledgements (NACK), and bus idle periods. It also detects when the token belongs to that unit (MYITT) and captures the address of each token (ITTADDR). The received data then goes to the transmit and receive select and encode block (XMT/RCV Select/Encode Block) 604. This block determines which data paths are used for both the transmit and receive data. RMASK causes the received data to be masked (i.e., set to all 0s). In the receive direction, this block can also select the token message (ITT) generated internal to the snooper. In the transmit direction, the data from the ARCNET transceiver (XMTI) also goes through the XMT/RCV Select/Encode Block. In the transmit direction, this block selects either the transmit data from the ARCNET transceiver or the free buffer enquiry (FBE) data message generated by the snooper. (Note that in this implementation, the XSEL input selects whether the ARCNET transceiver's data or the generated FBE message is transmitted. The FBESEL signal selects whether the data received from the bus or the generated ITT message is sent to the ARCNET transceiver. In order to keep the bus activity that both the local ARCNET transceiver and all the other transceivers on the bus expect to see.) The Message Generator Block 606 generates the ITT and FBE messages when it is enabled by the ITTEN and FBEEN signals, respectively, from the Control Block 608. The FBEADDR is the address of the unit to which the FBE message is destined. The Map Block 610 contains the old map, new map, and the master map that is read by the microprocessor. ADDR and RDEN are the read address and read enable from the microprocessor 612. The Control Block 608 contains the control state machines that enable all of the other circuits in the snooper.

The SERDAT is the serial recovered data. The WRADDR is the write address for the old and new maps. The MAPMV is the map move signal that enable the moving of the data from the new map to the old and master maps and the resetting of the new map. OMRDADDR is the read address for the old map. OMWREN and NMWREN are the write enables for the old and new maps, respectively. OMDOUT is the output of the old map location selected by OMRDADDR. NOTEMPTY is the signal indicating whether or not the old map is empty (i.e., contains all 0s). INTP is the interrupt output to the microprocessor 612. The data and the data clock are first recovered in the clock and data recovery (CDR) block 600. The CDR block 600 contains a phase-locked loop that that provides a continuous clock at the nominal 2.5 MHz data rate that is phase-locked to the most recent data received.

Figure 7:
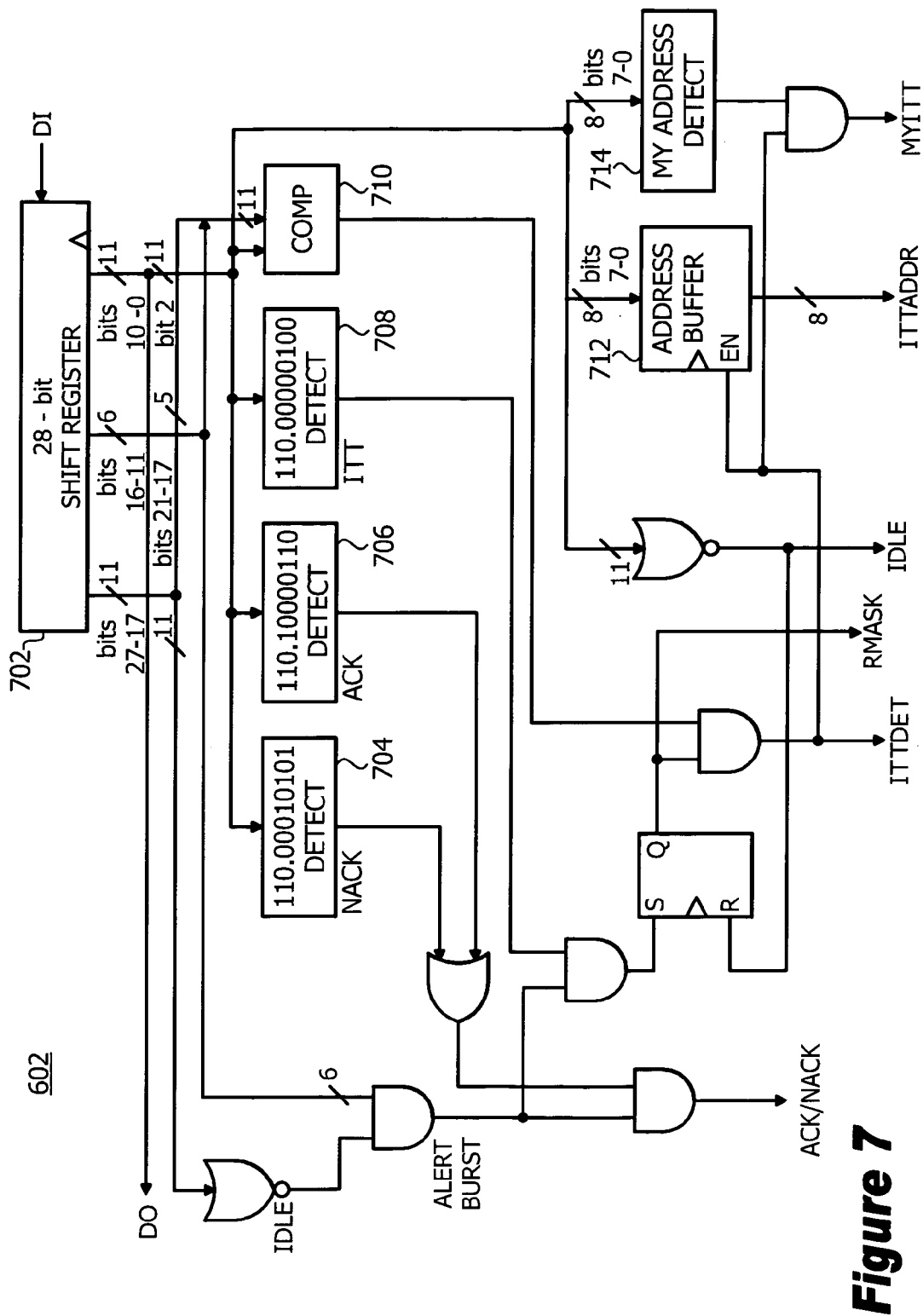
FIG. 7 illustrates the Buffer and Detect Block of FIG. 6.

The recovered data goes into a Buffer and Detect Block 602, which is illustrated in FIG. 7. Here, the different types of packets are detected and the address of tokens is stored. Note that ARCNET refers to a token as an Invitation To Transmit (ITT). The format of an ARCNET packet is that each packet begins with an "alert burst" of six 1s, and each byte of the packet is preceded by a 110 pattern. An ITT contains a packet typed identifier followed by the destination address repeated twice. The ACK and NACK packets contain only the packet type identifier byte. Note that this block 602 forwards the data to the next block after only a few bits of delay so that it won't impact the idle timer in the SCU's ARCNET transceiver 504. When this block 602 detects the presence of the unit's own ITT, it sets the RMASK signal which masks the ITT packet forwarding to the SCU's ARCNET transceiver 504 as discussed above.

Thus, in order to detect the presence of the ITT, ACK, or NACK messages and save the address of the ITT messages, the receive data is placed into a shift register 702. The NACK, ACK, and ITT detect blocks 704, 706, 708 detect the bit patterns of the message type identifier of those messages (bit patterns shown in the block). In ITT messages, the message type field is followed by two copies of the destination address. The COMP block 710 compares these two copies of the destination address to make sure they contain the same value. If the two are not identical, the ITT message is ignored. The Address Buffer block 712 stores a copy of the ITT address. The My Addr. Detect block 714 detects whether the ITT is that of the unit containing the snooper. The logic detects the idle that exists between messages, the alert burst that begins each message.

Figure 8:
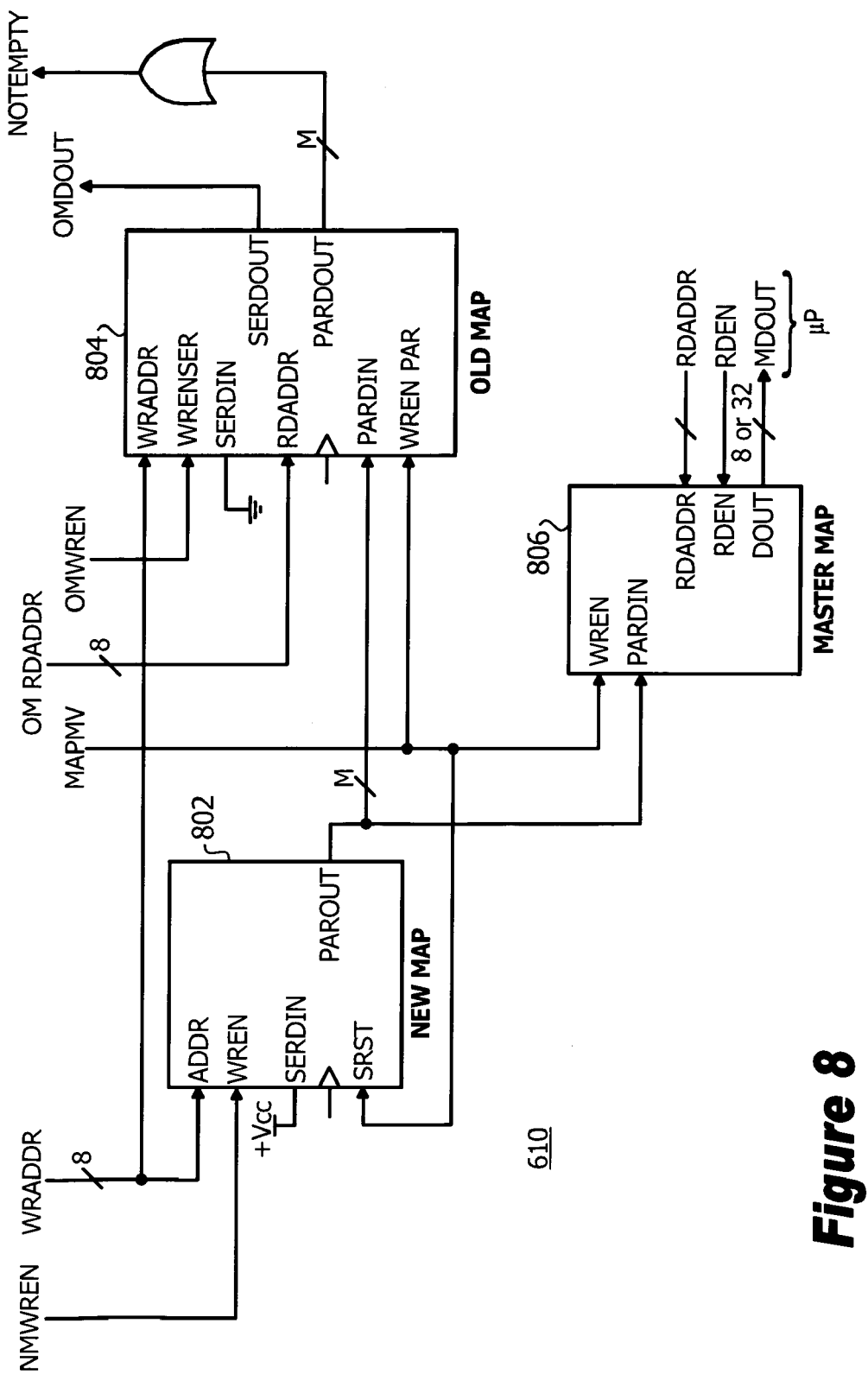
FIG. 8 illustrates the Map Block Diagram of FIG. 6.

Referring now to FIG. 8, the same illustrates the Map Block 610 of FIG. 6. As discussed above, the Map block 610 consists of the new 802, old 804, and master 806 maps. Each of these maps contains one data bit for each unit that can be in the system with the memory address of that bit being the same as the ARCNET address of that unit. In the new 802 and master 806 maps, that bit is set to a "1" if the unit is present and a "0" if the unit is not. Remember that the new map 802 contents are written into the old map 804 at the beginning each new token rotation. Whenever a "1" is written to a location in the new map, a "0" is written to the same location in the old map 804. If there is no change in the map, at the end of the token rotation all of the "1" entries in the old map 804 will have been reset to "0" and no pings are required. Note that an alternative implementation would be to use an address stack instead of the old map 804. The addresses of those units deleted from the token rotation would be stored on the stack to be used during the verification. A stack implementation is somewhat more complex, however.

Thus, the map block 610 contains the new map 802 which is built during each token rotation, the old map 804 which is initialized to contain the map from the previous token rotation, and the master map 806 that is read by the microprocessor to find the current bus system population. Each map consists of M single bit locations, where M is the maximum number of units that can be present in the system (on the ARCNET bus). WRENSER is the serial data input write enable. SERDIN is the serial data input (i.e., the input to each memory location). SERDOUT is the serial data output. PARDIN and PARDOUT are the parallel input and output for the maps. WRENPAR is the parallel data write enable. SRST is a synchronous reset.

Figure 9:
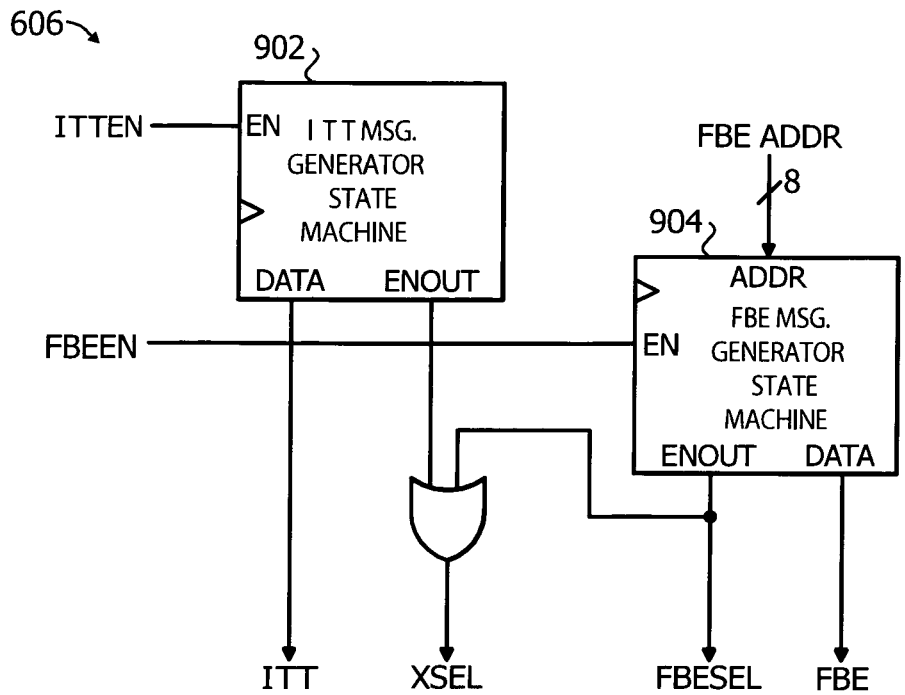
FIG. 9 illustrates the Message Generation Block of FIG. 6.

Referring now to FIG. 9, there is illustrated the Message Generation Block 606 of FIG. 6. The Message Generation Block 606 contains the state machines that generate both the FBE messages used for the ping and ITT message that is forwarded to the SCU's ARCNET transceiver 504 after the verification and map updates. The FBE address comes from an address counter in the Control Block 608 discussed below. The state machines also output the appropriate enable signals for the Transmit and Receive Select/Encode Block to steer the messages in the appropriate direction. Thus, the Message Generation Block 606 consists of two state machines, one of which 902 generates an ITT message to be sent to that unit's ARCNET transceiver and the other of which 904 generates an FBE message to with the destination address provided by the FBEADDR input.

Figure 10:
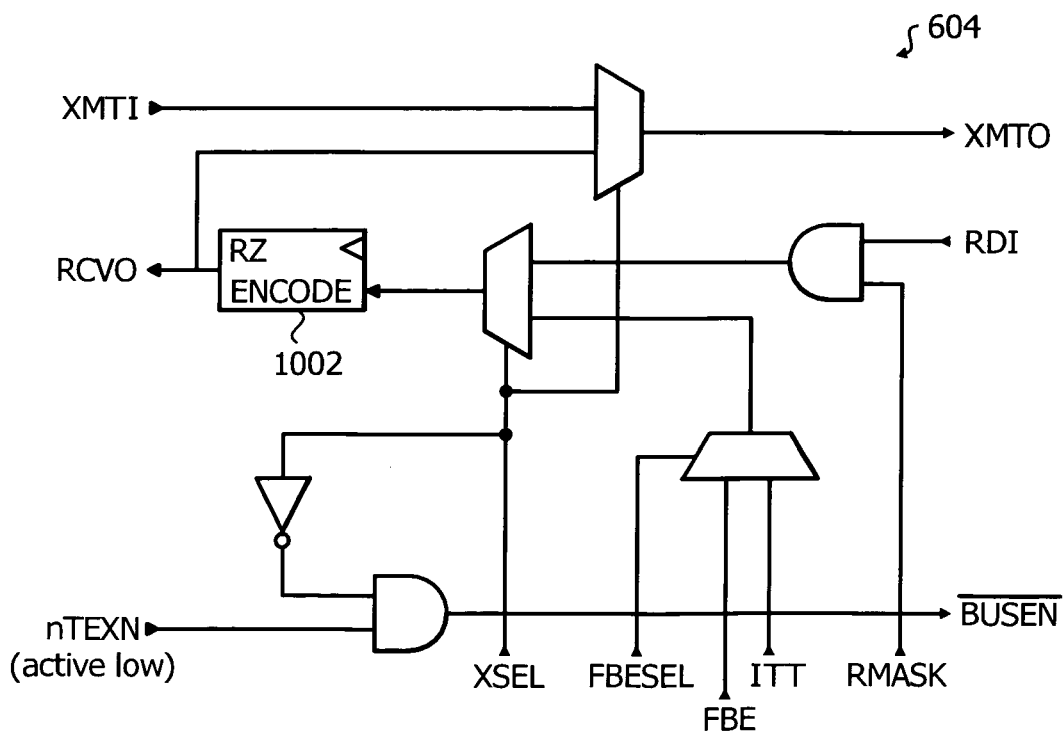
FIG. 10 illustrates the XMT/RCV Select/Encode Block of FIG. 6.

Referring now to FIG. 10, the Transmit and Receive Select/Encode Block 604 will be discussed. The Transmit and Receive Select/Encode Block 604 selects which data will be transmitted on the ARCNET bus 502 and which data will be forwarded to the SCU's ARCNET transceiver 504. Messages being forwarded to the SCU's ARCNET transceiver 504 must be re-encoded into the Return to Zero (RZ) pulses expected by the transceiver 504. The internally-generated ITT and FBE messages are sent both to the ARCNET bus 502 and to the SCU's ARCNET transceiver 504 in order to keep the bus activity that all of the transceivers on the bus expect to see. As noted above, the masking of the SCU's own ITT is performed here.

As discussed above, RDI (receive data input) is masked to all 0s if the RMASK signal is low. XSEL selects whether the transmit and receive messages go through the Transmit and Receive Select/Encode Block 604 or whether the message output to the local transceiver 504 is and the ARCNET bus 502 is one generated by the snooper 500. The FBESEL selects whether the internally-generated message is the ITT or FBE. nTXEN is the ARCNET bus enable from the ARCNET transceiver. The bus is enabled (BUSEN active low) if either nTXEN is low or if XSEL is high (for the transmission of an internally generated message). The RZ encoder block 1002 generates the RZ signal format used by the ARCNET transceiver 504.

Figure 11:
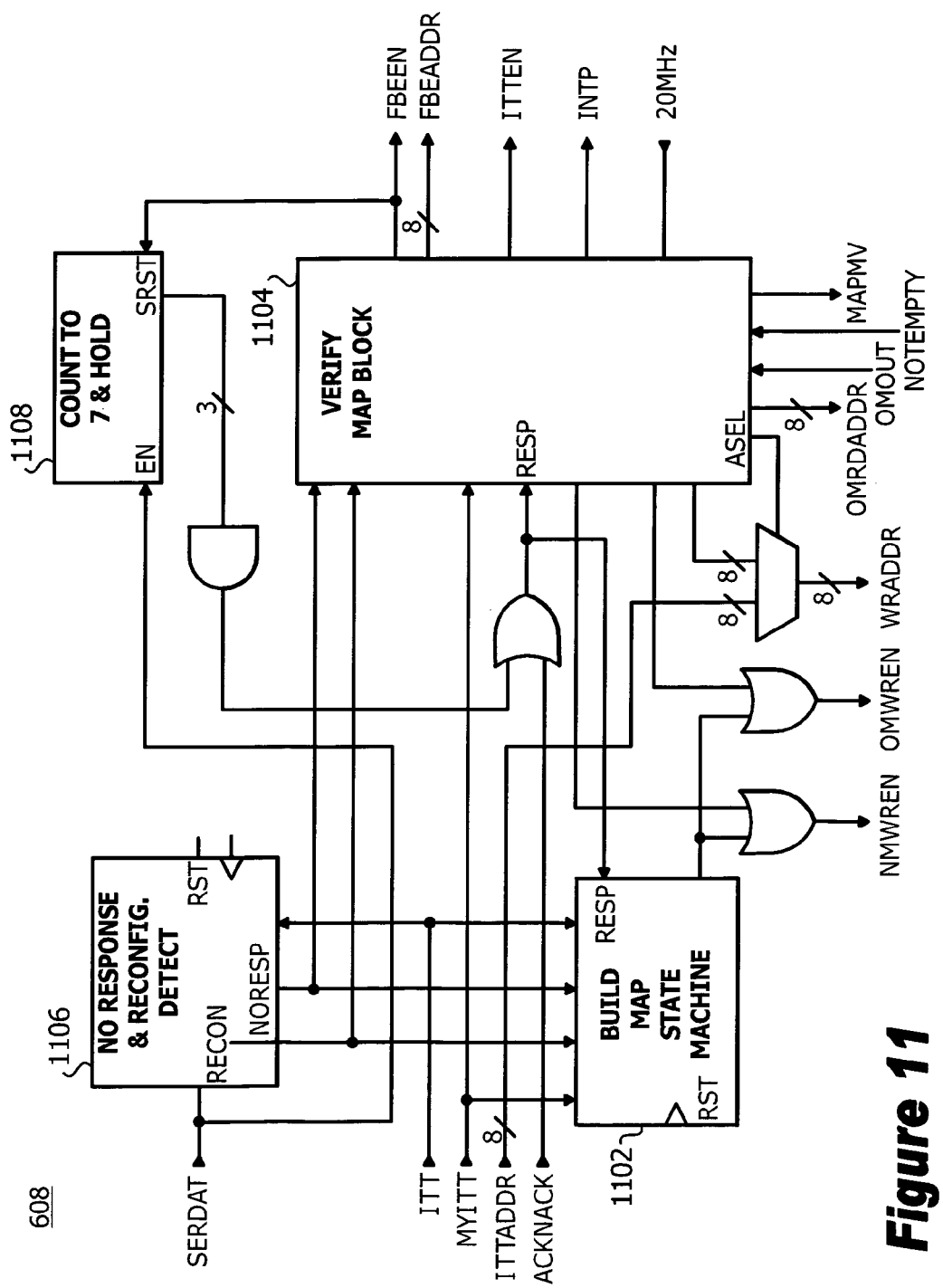
FIG. 11 illustrates the Control Block of FIG. 6 in a high-level block diagram.

The Control Block 608 of FIG. 6 will now be discussed with reference to FIGS. 11–18. The high-level block diagram of Control Block 608, as illustrated in FIG. 11, consists of a state machine to control building the new map 1102, a state machine to control verifying the new map 1104 at the end of the token rotation, a counter 1106 to detect a no-response to either an ITT or an FBE as well as bus reconfigurations, and a counter 1108 that is used to provide robust detection of the ACK and NACK responses to the ping FBEs. An ACK and a NACK message both have eleven 1s. Since the Buffer and Detect Block 602 looks explicitly for ACK and NACK messages, it would not recognize them if a bus error corrupted one of the message bits. The Count-to-Seven-and-Hold counter 1108 looks to see if there have been at least seven 1s on the ARCNET bus in the time window in which the ACK or NACK are expected and regards that as being a response to the FBE. If the seven or more 1s are actually bus noise on an idle bus, then the result will be simply one more token rotation before that unit is seen to be missing. Since the consequences of falsely declaring a unit to have been removed are much more serious than waiting one more token rotation to see the removal, it is much better to assume that the unit is still there in this case than to declare it missing.

Thus, the Control Block 608, in this implementation, consists of four blocks. The No-Response and Reconfiguration Detect block 106 is a counter that monitors the received bus data to detect the periods of bus inactivity corresponding to a lack of response to an ITT message and for a bus reconfiguration. The Build Map block 1102 is a state machine that controls the building of the new map during each token rotation. The Verify Map block 1104 contains a state machine and other logic that controls the process of verifying the data in the new map by sending the FBE messages to each unit that has disappeared from the map since the previous token rotation. The Count to 7 and Hold 1108 is used to insure that responses to the FBE query messages are detected even if bus transmission errors occur. Each unit that is actually present should respond to the FBE ping message with either an ACK or a NACK. The Buffer and Detect block 602 detects valid ACK and NACK messages. For greater robustness, it desirable to be able to detect responses to the FBE even in the presence of bus transmission errors that can corrupt the ACK or NACK message. The Count to 7 and Hold block 1108 looks for a minimum of seven 1s during the interval in which the ACK/NACK is expected and the circuit regards seven or more ones here as a response.

Figure 12:
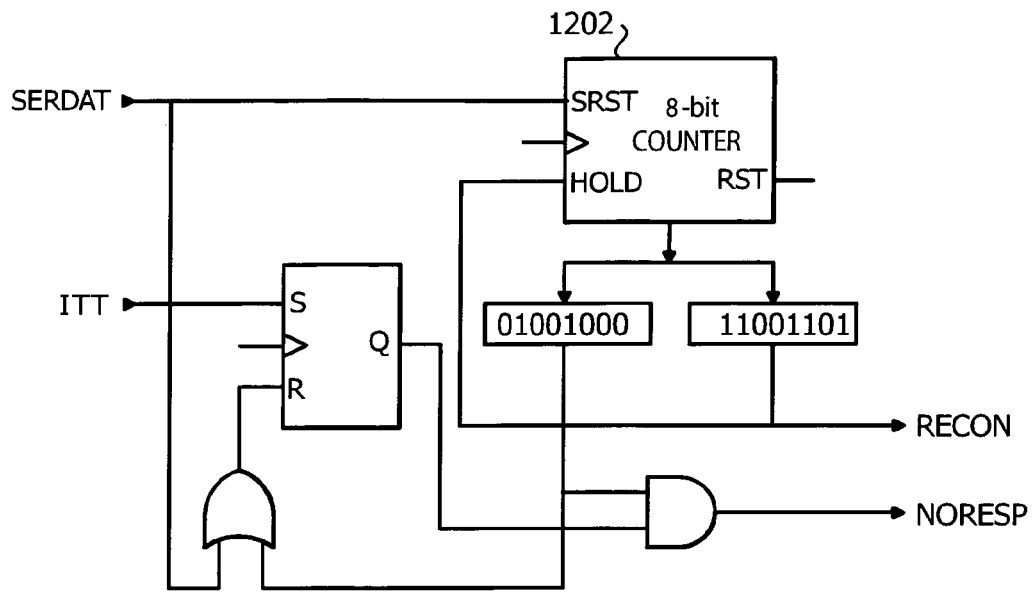
FIG. 12 illustrates the Reconfiguration and No-Response Detect block of FIG. 11.

Referring now to FIG. 12, the same illustrates the Reconfiguration and No-Response Detect block 1106 of FIG. 11. The Reconfiguration and No-Response Detect block 1106 which is within the Control Block 608 consists of a counter 1202 that is enabled to count whenever the incoming received ARCNET bus data is "0", and is reset whenever it is "1". A bus reconfiguration is detected by an adequate number of consecutive "0s", indicating no bus activity. The circuit tracks whether there is a response to an ITT message. If there is a response within the required window, the presence of the unit addressed by the ITT is logged as being present in the new map. If there is no response, then the NORESP signal is asserted.

Figure 13:
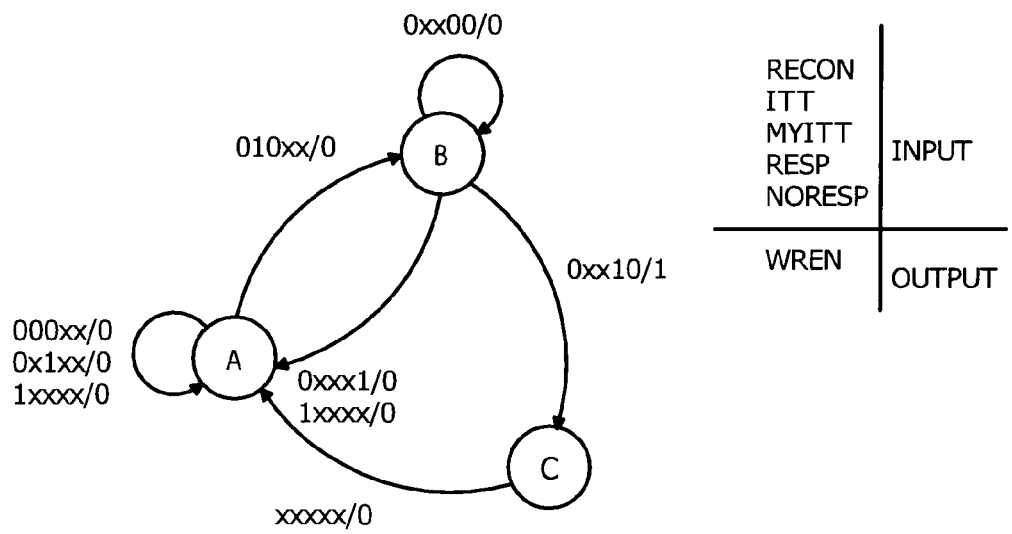
FIG. 13 illustrates the Build Map Statue Machine of FIG. 11.

The Build-Map State Machine 1102 is illustrated in FIG. 13. The Build-Map State Machine 1102 covers both the building of the initial map after a bus reconfiguration and building the new map during normal operation. As discussed above, it enables the writing to the new map and the old map based on whether a unit responds to its ITT.

This finite state machine (FSM) of block 1102 controls the building of the new map by controlling when data is written to the new map. The FSM stays in state A until an ITT is detected, which causes a transition to state B. The FSM stays in state B waiting to see if there is a response to the ITT by its destination unit. If there is no response, the FSM returns to state A to wait for the next ITT. If there is a response to the ITT, then the FSM enters state C and generates a write enable to the new and old maps, and returns again to state A. The transition through state C provides the delay needed to allow re-initializing of some of the other circuits. Note that whenever a reconfiguration is detected, the FSM goes to state A.

Figure 14:
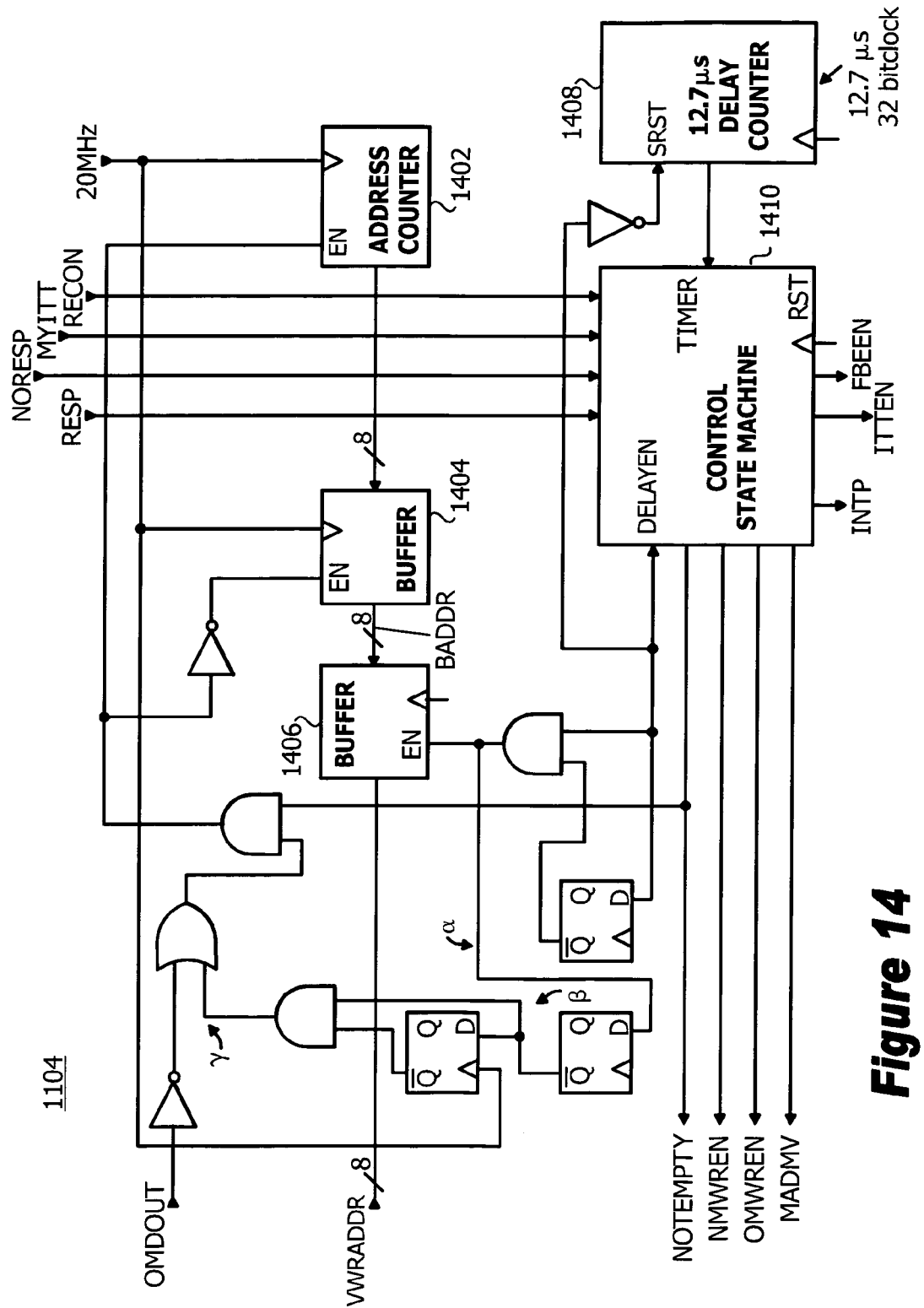
FIG. 14 illustrates the Verify Map block of FIG. 11.
Figure 16:
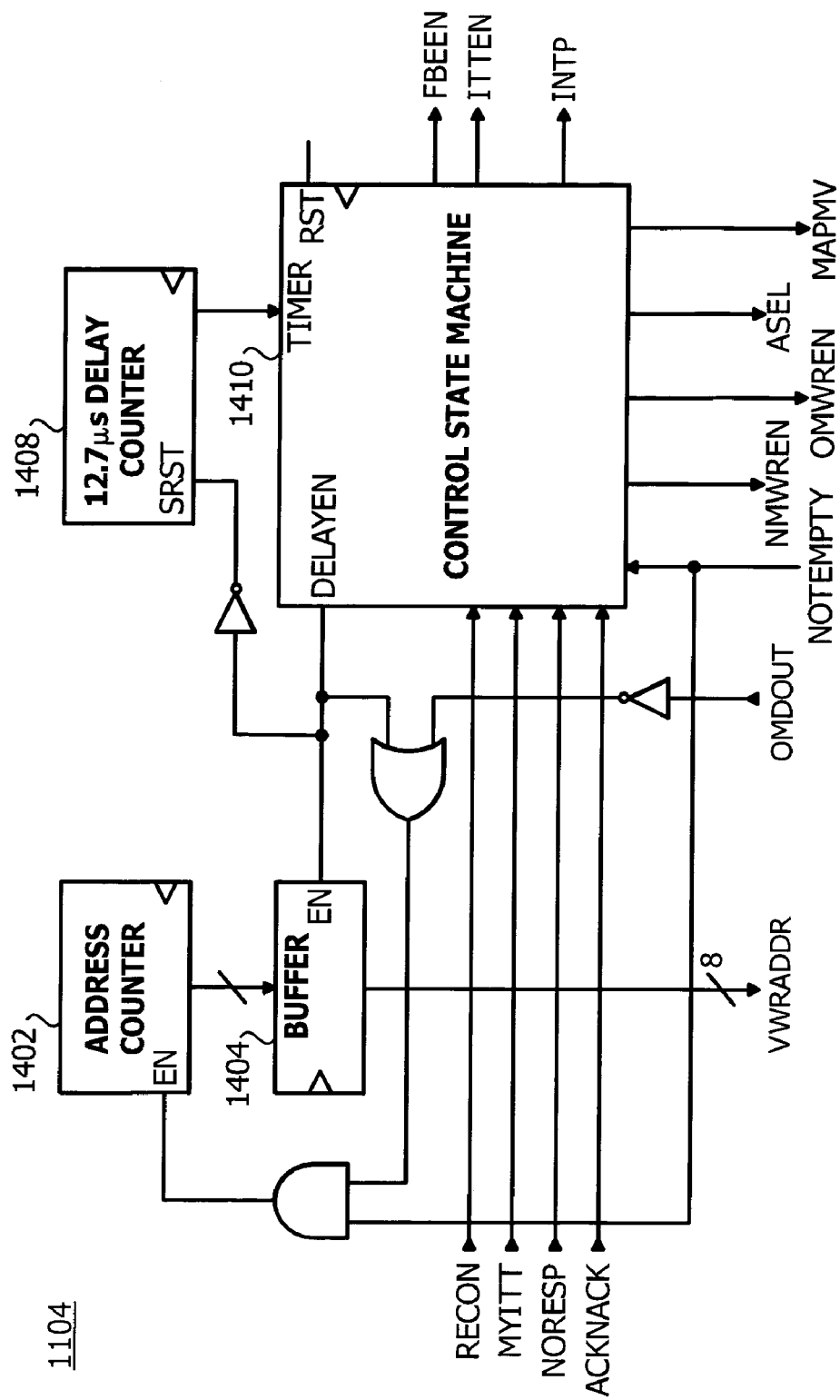
FIG. 16 illustrates an alternative configuration of the Verify Map block of FIG. 11.

The Verify Map Block 1104 will now be described with reference to the block diagram of FIG. 14 and the alternate implementation of FIG. 16. The Verify Map Block 1104 consists of an address counter 1402 and buffers 1404, 1406, a delay counter 1408, and its control state machine 1410. The 12.7 μs Delay Counter is used to meet the ARCNET timer demand of a 12.7 μs delay between receiving a message and beginning the transmission of any message, including responses. The address counter 1402 finds the address location of the next 1 location in the old map (i.e., the next message that needs to be pinged). This search for the next 1 is performed in parallel with the current ping. A ping should take a minimum of 57 bit periods plus two 12.5 μs turnaround time periods (120 bit clock cycles total). Therefore, since ARCNET supports up to 255 addresses a higher-speed clock must be used for the Address Counter if there are more than 120 units that can be present in the system in order to insure that the next address will be found before it is required. In FIG. 14, the 20 MHz clock that was assumed for the CDR block is used for the it Address Counter 1402. If there are less than 120 units that can be in the system, the simpler circuit of FIG. 16 can be used. FIG. 16 is an alternative implementation to the one shown in FIG. 14. Here all of the circuits, including the address counter 1402, operate with the 2.5 MHz clock. If there are fewer than 121 units that will be present on the ARCNET bus, then this implementation can be used since it will always be able to find the next "1" in the old map prior the end of a FBE send and response cycle.

Thus, block 1104 consists of the following pieces. The main block is the control state machine 1410 that controls the verifying of the new map after the completion of each token rotation. The address counter 1402 supplies the address of the next location in the old map that needs to be verified. The 12.7 μs delay counter is used to detect whether there is a response to the FBE. (A unit on an ARCNET bus is required to respond to messages within 12.7 μs.) The additional buffers 1404, 1406 and control logic are used to provide synchronization between the address counter 1402 that uses a 20 MHz clock and the rest of the system that uses a 2.5 MHz clock. (The normal bus clock for the ARCNET bus uses 2.5 MHz.) The address counter 1402 is incremented until either an address location in the old map is found with a 1 (i.e., a location corresponding to a unit that was present during the last token rotation but was not observed to have responded to a token on the rotation just completed), or when the old map is empty. Running the address counter 1402 at the faster rate guarantees that the address counter can find the next "1" by the time the current FBE sending and response cycle is complete.

Figure 15:
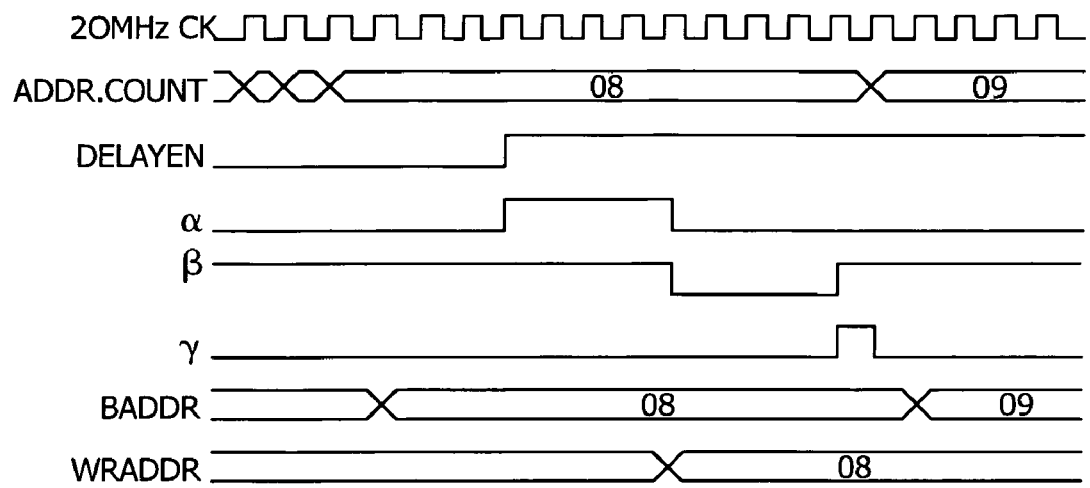
FIG. 15 illustrates the Address Counter Timing Diagram for the circuit of FIG. 14.
Figure 17:
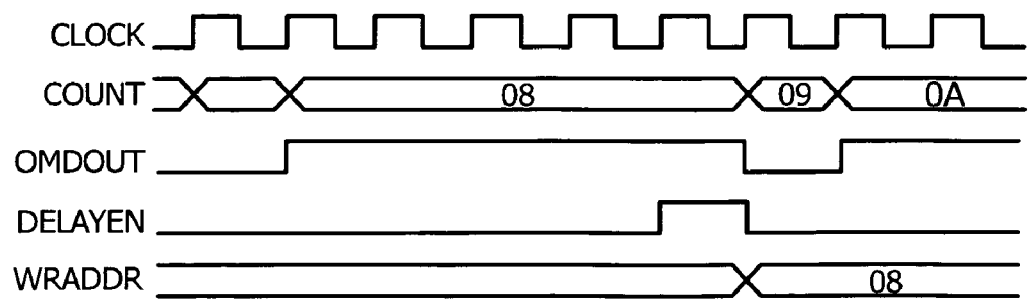
FIG. 17 illustrates the Address Counter Timing Diagram for the circuit in FIG. 16.

The timing diagrams for the Address Counters in FIGS. 14 and 16 are given in FIGS. 15 and 17, respectively. Whenever there are no longer any 1s in the old map, all the removed unit addresses have been verified. FIG. 15 shows the timing relationships that allow synchronizing the output of the address counter, which operates with the 20 MHz clock, to the rest of the circuit that operates with the 2.5 MHz clock. FIG. 17 shows the timing relationships of the various signal when the address counter looks for the next 1 in the old map.

Figure 18:
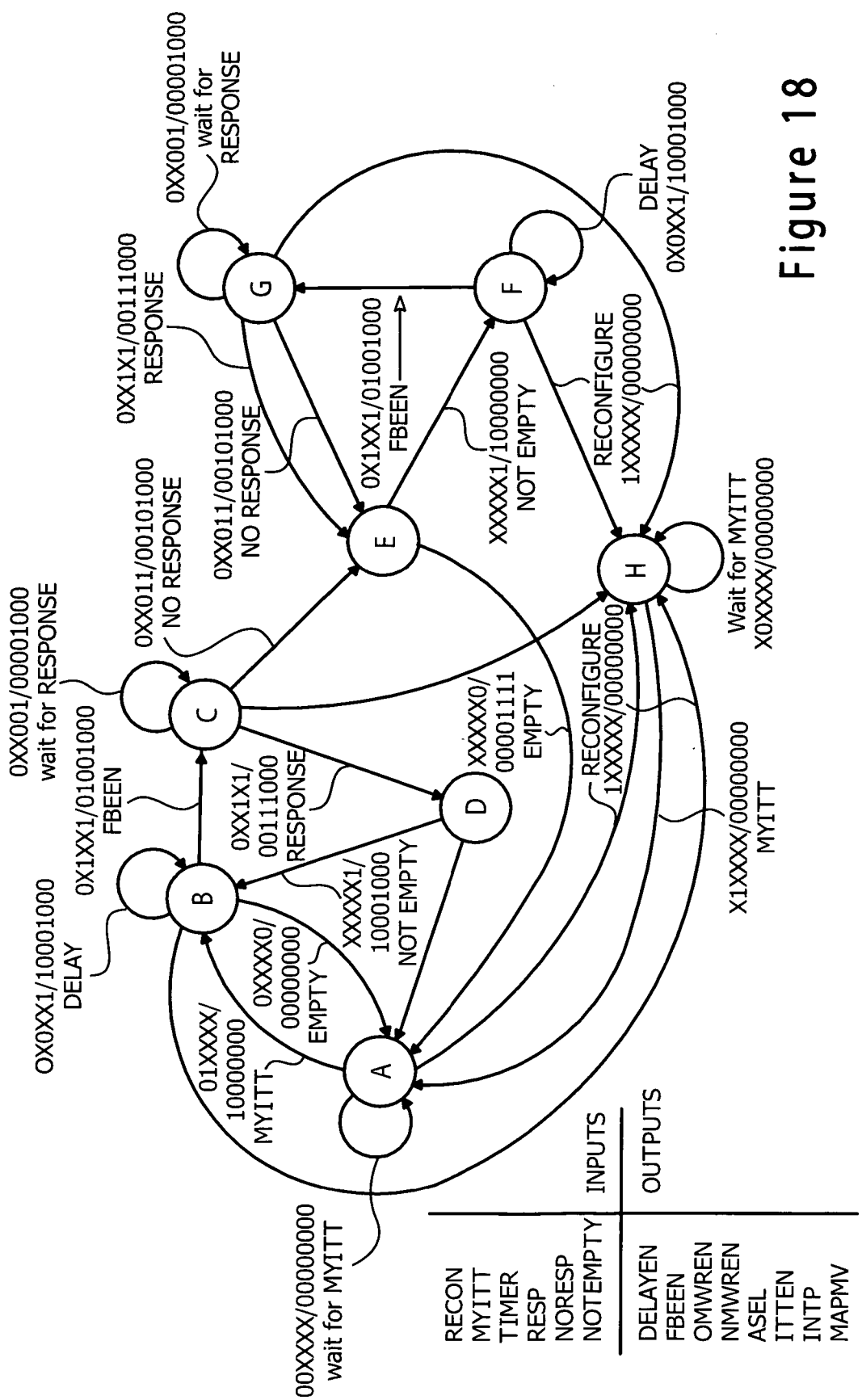
FIG. 18 illustrates the Verify Map Control State Machine of block 1104 of FIG. 11.

The verification block's 1104 control state machine is illustrated in FIG. 18. Reconfigurations are handled by freezing map updates until the SCU receives a token. After this, the map is built in the same manner as during normal operation. If there is a response to a ping, a 1 is written to that address location in the new map and a 0 to that location in the old map. If there is no response to the ping, then a 0 is written to the old map and the new map is left unmodified. Whenever all of the bits of the old map are 0, (i.e., the old map is empty) the verification is complete. If there have been any instances of no response to a ping, an interrupt is generated for the SCU's microprocessor.

Thus, when a bus reconfiguration is detected, the FSM goes to state H, regardless of which state it was in. Once the snooper's own unit's token is seen (MYITT=1), it transitions to state A. State A is the starting state of the FSM at the beginning of each new token rotation. When the FSM is in state A and the unit's own token is detected again (i.e., MYITT=1 indicating the completion of a token rotation), the FSM transitions to state B and enables the delay counter (DELAYEN=1). State B is a delay state where the FSM waits until a timer expires. If the old map is not empty (NOTEMPTY=1), the FSM transitions from states B to C and enables the generation of an FBE message (FBEEN=1) with the address select set to take the FBE address from the control block rather than from the Buffer and Detect Block (ASEL=1). State C is where the FSM waits to see if there will be a response to the FBE. If there was a response (RESP=1), the FSM transitions to state D and generates the write enables to old and new maps with proper address (OMWREN=1, NMWREN=1, ASEL=1). If the old map is not empty (NOTEMPTY=1), the FSM transitions back to state B to begin the cycle of checking the next unit that did not respond during the last token rotation (i.e., the next non-zero entry in the old map). DELAYEN=1 here to begin the delay timer. If the old map is empty (NOTEMPTY=0), then the map verification is complete with no changes to the map and the FSM transitions back to state A to wait for the completion of the next token rotation. During this transition from states D to A, the Message Generator block is enabled to forward the token to the unit's ARCNET transceiver (ITTEN=1), and the new map is moved to the old map and master maps with the new map being reset (ASEL=1 and MVMAP=1).

If, when the FSM is state C, it detects that there was no response to the FBE (NORESP=1), then the FSM transitions to state E and enables a write to the old map (OMWREN=1) to the address location of the failed FBE location (ASEL=1). If the old map is empty (NOTEMPTY=0), then the verification is complete and the FSM transitions from state E back to A. Since at least one of the addresses from the old map did not respond to the FBE, then there is at least one unit that has been removed from the bus, so during this transition back to state A an interrupt is generated for the microprocessor (INTP=1) and the new map is transferred to the old map and master map (ASEL=1, OMWREN=1, and NMWREN=1), with the new map being reset. If the old map is not empty (NOTEMPTY=1) then the FSM transitions from state E to F, enabling the delay for the next verification query (DELAYEN=1).

States F and G are functionally identical to states B and C, respectively, as state E is functionally similar to state D. State F is the protocol delay timer prior to sending the next FBE message. When the delay has expired (TIMER=1), the FSM transitions to state G where the FSM waits to see if there will be a response to that FBE. If there is a response (RESP=1), the FSM transitions back to state E, enabling the writes to both the old and new maps (OMWREN=1, NMWREN=1, and ASEL=1). If there is no response (NORESP=1), the FSM also transitions back to state E, but only enables the write to the old map (OMWREN=1, ASEL=1). States B, C, and D are used as long as every unit that is queried with the FBE message responds to the FBE (i.e., is still present). States E, F, and G are used when one of the queried units is actually removed (i.e., does not respond).

The following is a glossary for signal names used in the figures and detailed description of the present invention:

| Signal | Description |
|---|---|
| ACKNACK | ACK or NACK detected |
| ADDR | Address |
| ASEL | Address select |
| BUSEN | Bus transmit enable |
| DELAYEN | Enable bus turnaround delay timer |
| DI | Data in |
| DO | Data out |
| DOUT | Data out |
| EN | Enable |
| FBE | Free Buffer Enquiry packet |
| FBEADDR | Address for the FBE |
| FBEEN | Enable FBE transmission |
| FBESEL | Select for FBE transmission |
| IDLE | Idle bus detected |
| ITT | Invitation to Transmit packet |
| ITTADDR | ITT's address |
| ITTDET | ITT detected |
| ITTEN | Enable ITT transmission |
| INT or INTP | Interrupt for the microprocessor |
| LDEN | Load enable |
| MAPMV | Map move (from new to old and master maps) |
| MYITT | SCU's ITT detected |
| nTXEN | Transmit bus enable from the ARCNET transceiver |
| NMWREN | New map write enable |
| NORESP | No response to FBE detected |
| NOTEMPTY | Old map not empty (i.e., still contains 1s) |
| OMDOUT | Old map data output |
| OMRDADDR | Old map read address |
| OMWREN | Old map write address |
| PARDIN | Parallel data input |
| PARDOUT | Parallel data output |
| RCVI | Receive data input |
| RCVO | Receive data output |
| RDADDR | Memory read address |
| RDEN | Memory read enable |
| RECON | Bus reconfiguration detected |
| RESP | Response to FBE detected |
| RMASK | Received token mask |
| RST | Reset |
| SERDAT | Serial data |
| SERDIN | Serial data input |
| SERDOUT | Serial data output |
| SRST | Synchronous reset |
| TIMER | Bus turnaround delay time expired |
| WRADDR | Memory write address |
| WREN | Memory write enable |
| WRENPAR | Parallel memory write enable |
| WRENSER | Serial memory write enable |
| XMTI | Transmit data input |
| XMTO | Transmit data output |
| XSEL | Transmit select |

This invention allows the very fast building and confirmation of the map showing which units are present on the LAN in a manner that is robust to transmission errors on the bus. Previous techniques suffered either reliability problems with transmission errors or required too much time to reliably detect unit removal/failure. The invention disclosed significantly improves the reliability and real-time speed of the map building circuit over ones currently used. The increased speed and reliability significantly simplifies the real-time unit protection switching system software.

The methods of the present invention are particularly suited to be carried out by a computer software program, such computer software program preferably containing modules corresponding to the individual steps of the methods. Such software can of course be embodied in a computer-readable medium, such as an integrated chip or a peripheral device.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for detecting units present on a network bus, the method comprising:
   (a) monitoring a token rotation to determine the units which are present on the network bus;
   (b) building an initial map of the network bus according to the monitored token rotation;
   (c) monitoring a subsequent token rotation to determine the units which are present on the network bus at the subsequent time;
   (d) building a new map of the network bus according to the subsequent token rotation by storing the addresses which respond to the transmitted token rotation;
   (e) comparing the initial and new maps of the network bus to determine any differences therebetween;
   (f) sending a free buffer enquiry to each address in the initial map which is determined to be missing from the new map; and
   (g) building a master map of the units present on the network bus based on the new map and the responses to the free buffer enquiries.

2. The method according to claim 1, further comprising the step of updating and reinitializing the initial and new maps if the comparing step determines that the initial and new maps are different.

3. The method according to claim 1, further comprising the step of writing a one into memory to indicate a response to the transmitted token rotation and writing a zero into memory to indicate no response has been received from the transmitted token rotation.

4. The method according to claim 1, further comprising the step of writing a one into memory to indicate a response to the free buffer enquiry and writing a zero into memory to indicate no response has been received from the free buffer enquiry.

5. The method according to claim 3, wherein the sending of the free buffer enquiry is performed by searching the initial map from the lowest to the highest value for ones.

6. The method according to claim 3, wherein the sending of the free buffer enquiry is performed by searching an initial map for the next address with a one as long as a one exists in the initial map.

7. The method according to claim 1, further comprising the step of tolerating a predetermined number of bit errors on the responses to the free buffer enquires.

8. The method according to claim 1, further comprising repeating steps (a)–(g) wherein the new map from the previous token rotation becomes the initial map.

9. An apparatus for detecting units present on a network bus, the apparatus comprising:
   means for monitoring a token rotation to determine the units which are present on the network bus;
   means for building an initial map of the network bus according to the monitored token rotation;
   means for monitoring a subsequent token rotation to determine the units which are present on the network bus at the subsequent time;
   means for building a new map of the network bus according to the subsequent token rotation by storing the addresses which respond to the transmitted token rotation;
   means for comparing the initial and new maps of the network bus to determine any differences therebetween;
   means for sending a free buffer enquiry to each address in the initial map which is determined to be missing from the new map; and
   means for building a master map of the units present on the network bus based on the new map and the responses to the free buffer enquiries.

10. The apparatus according to claim 9, further comprising means for updating and reinitializing the initial and new maps if the means for comparing determines that the initial and new maps are different.

11. The apparatus according to claim 9, further comprising means for writing a one into memory to indicate a response to the transmitted token rotation and writing a zero into memory to indicate no response has been received from the transmitted token rotation.

12. The apparatus according to claim 9, further comprising means for writing a one into memory to indicate a response to the free buffer enquiry and writing a zero into memory to indicate no response has been received from the free buffer enquiry.

13. The apparatus according to claim 11, wherein the sending of the free buffer enquiry is performed by searching the initial map from the lowest to the highest value for ones.

14. The apparatus according to claim 11, wherein the sending of the free buffer enquiry is performed by searching the initial map for the next address with a one as long as a one exists in the initial map.

15. The apparatus according to claim 9, further comprising means for tolerating a predetermined number of bit errors on the responses to the free buffer enquiries.

16. The apparatus of claim 9, further comprising a snooper device located between a token bus and a bus processing device such that the snooper device can gain control of the token by intercepting tokens destined for the bus processing device, thereby not requiring the snooper device to have its own token bus address.

17. The apparatus of claim 9, further comprising a snooper device located in parallel with a bus processing device, wherein the snooper device has its own token bus address such that the snooper device can gain control of the token bus in the same manner as other units on the bus.

18. A program storage device readable by machine, tangibly embodying a program of instructions executable by the machine to perform method steps for detecting units present on a network bus, the method comprising:
   monitoring a token rotation to determine the units which are present on the network bus;
   building an initial map of the network bus according to the monitored token rotation;
   monitoring a subsequent token rotation to determine the units which are present on the network bus at the subsequent time;
   building a new map of the network bus according to the subsequent token rotation by storing the addresses which respond to the transmitted token rotation;
   comparing the initial and new maps of the network bus to determine any differences therebetween;
   sending a free buffer enquiry to each address in the initial map which is determined to be missing from the new map; and building a master map of the units present on the network bus based on the new map and the responses to the free buffer enquiries.

19. The program storage device according to claim 18, further comprising the step of updating and reinitializing the initial and new maps if the comparing step determines that the initial and new maps are different.

20. The program storage device according to claim 18, further comprising the step of writing a one into memory to indicate a response to the transmitted token rotation and writing a zero into memory to indicate no response has been received from the transmitted token rotation.

21. The program storage device according to claim 18, further comprising the step of writing a one into memory to indicate a response to the free buffer enquiry and writing a zero into memory to indicate no response has been received from the free buffer enquiry.

22. The program storage device according to claim 20, wherein the sending of the free buffer enquiry is performed by searching the initial map from the lowest to the highest value for ones.

23. The program storage device according to claim 20, wherein the sending of the free buffer enquiry is performed by searching the initial map for the next address with a one as long as a one exists in the initial map.

24. A computer program product embodied in a computer-readable medium for detecting units present on a network bus, the computer program product comprising:
   computer readable program code means for monitoring a token rotation to determine the units which are present on the network bus;
   computer readable program code means for building an initial map of the network bus according to the monitored token rotation;
   computer readable program code means for monitoring a subsequent token rotation to determine the units which are present on the network bus at the subsequent time;
   computer readable program code means for building a new map of the network bus according to the subsequent token rotation by storing the addresses which respond to the transmitted token rotation;
   computer readable program code means for comparing the initial and new maps of the network bus to determine any differences therebetween;
   computer readable program code means for sending a free buffer enquiry to each address in the initial map which is determined to be missing from the new map; and
   computer readable program code means for building a master map of the units present on the network bus based on the new map and the responses to the free buffer enquiries.

25. The computer program product according to claim 24, further comprising computer readable program code means for updating and reinitializing the initial and new maps if the comparing step determines that the initial and new maps are different.

26. The computer program product according to claim 24, further comprising computer readable program code means for writing a one into memory to indicate a response to the transmitted token rotation and writing a zero into memory to indicate no response has been received from the transmitted token rotation.

27. The computer program product according to claim 24, further comprising computer readable program code means for writing a one into memory to indicate a response to the free buffer enquiry and writing a zero into memory to indicate no response has been received from the free buffer enquiry.

28. The computer program product according to claim 26, wherein the sending of the free buffer enquiry is performed by searching the initial map from the lowest to the highest value for ones.

29. The computer program product according to claim 26, wherein the sending of the free buffer enquiry is performed by searching the initial map for the next address with a one as long as a one exists in the initial map.

* * * * *